(12) United States Patent
Hirao et al.

(10) Patent No.: US 6,569,053 B2
(45) Date of Patent: May 27, 2003

(54) ECCENTRIC PINION CAGE

(75) Inventors: Wagner Yukio Hirao, Troy, MI (US); I-Chao Chung, Troy, MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 0 days.

(21) Appl. No.: 09/947,047

(22) Filed: Sep. 5, 2001

(65) Prior Publication Data

US 2003/0045392 A1 Mar. 6, 2003

(51) Int. Cl.[7] .................................... F16H 48/06
(52) U.S. Cl. ............................ 475/246; 74/396
(58) Field of Search .................. 74/396; 475/246

(56) References Cited

U.S. PATENT DOCUMENTS 6,364,803 B1 * 4/2002 Barnholt et al. ............ 475/246

* cited by examiner

*Primary Examiner*—Dirk Wright
(74) *Attorney, Agent, or Firm*—Howard & Howard

(57) ABSTRACT

A drive axle assembly is provided that includes an axle housing having a cavity. A differential case is disposed within the cavity. The ring gear is supported on the differential case such as by fastening the ring gear to a flange extending from the differential case. A pinion cage eccentrically supports the driveshaft and pinion, which are rotatable about a first axis. The pinion cage may be used for different axle assemblies having different gear ratios. Moreover, the same differential case may be used for the different axle assemblies. The pinion cage is rotatable relative to the carrier housing between first and second positions in which the first axis is spaced from the ring gear first and second distances, respectively. In this manner, the pinion offset and gear mounting distance may be varied. The pinion cage is secured to the housing, preferably by fasteners, in one of the positions to accommodate a particular gearset.

8 Claims, 2 Drawing Sheets

GEAR MOUNTING DISTANCE

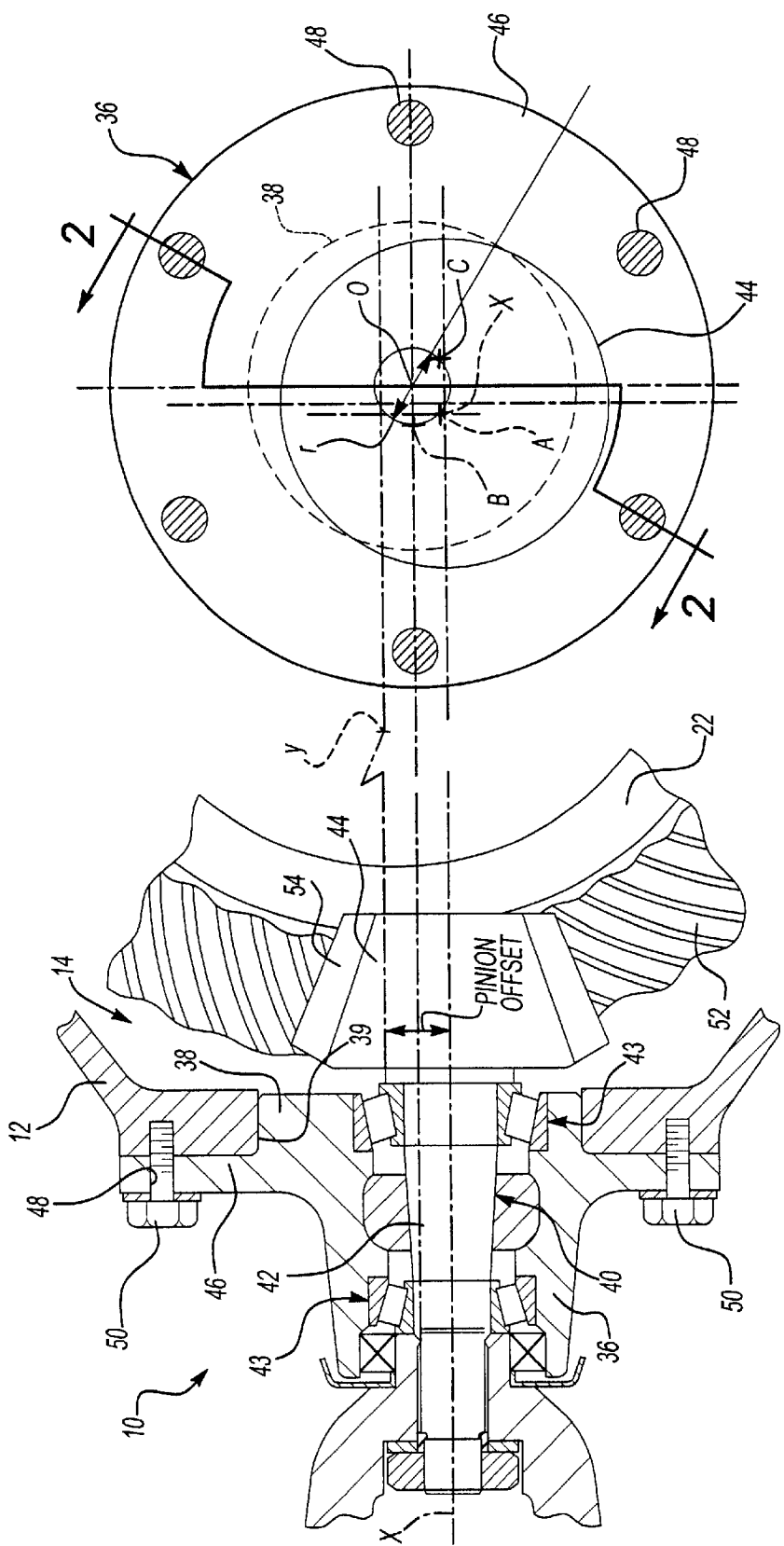

ECCENTRIC PINION CAGE

BACKGROUND OF THE INVENTION

This invention relates to a differential assembly for an axle, and more specifically, the invention relates to differential assemblies for which multiple gear ratios is desirable. This invention can also be applied to any mechanical device with any type of bevel gears that requires multiple gear ratios that include hypoid gears, spiral bevel gears, straight bevel gears, and their variations.

Drive axles typically incorporate a differential assembly to permit the wheels on opposing ends of the axle assembly to rotate at different speeds. The differential assembly includes a ring gear that is driven by a pinion, which receives rotational drive from the engine through the transmission. The mechanical relationship between the pinion and ring gear provides a gear ratio which provides a mechanical advantage, or increased torque, to the wheels.

Often it is desirable to provide multiple gear ratios for a given axle, especially for automotive applications. It is desirable to maintain as many common components between the different axle assemblies to minimize costs. The differential assembly may include a differential case with a ring gear supported thereon. The ring gear may be fastened to a flange extending from the differential case. Typically, the pinion and ring gear are changed to provide different ring gear ratios for the different axle assemblies. A smaller diameter pinion is used to provide an increased torque amplification. Obviously, when a different sized pinion is used the ring gear or the differential case must also be changed to align and couple the pinion and ring gear.

If a common differential case and flange location is to be used for multiple gear ratios, the thickness of the ring gear must be increased or decreased so that the pinion will couple the ring gear. That is, for a larger diameter pinion a thinner ring gear must be used, and conversely, for a smaller diameter pinion a thicker ring gear must be used. However, using a thicker ring gear simply to maintain engagement with the pinion is undesirable because it adds unnecessary weight and cost to the ring gear. As a result, a differential case has been used with a different flange location for a range of different gear ratios. This also is undesirable because multiple differential cases must be manufactured which adds cost to the axle assembly. Therefore, what is needed is an axle assembly that uses a common differential case and limited ring gear thickness variation for multiple axle gear ratios.

Sometimes a different pinion offset is desirable in a bevel gearset for an optimized gear design to suit a particular application. A real situation is when a spiral bevel gearset (no offset) is best for one vehicle, while a hypoid gearset (with offset) is ideal for another vehicle. Changing pinion offset typically requires changing major structures such as carrier housing, which is economically inconvenient.

SUMMARY OF THE INVENTION AND ADVANTAGES

The present invention provides a drive axle assembly including an axle housing having a cavity. A differential case is disposed within the cavity. The ring gear is supported on the differential case such as by fastening the ring gear to a flange extending from the differential case. A pinion cage eccentrically supports the driveshaft and pinion, which are rotatable about a first axis. The pinion cage may be used for different axle assemblies having different gear ratios and pinion offsets. Moreover, the same differential case may be used for the different axle assemblies. The pinion cage is rotatable relative to the carrier housing between first and second positions in which the first axis is spaced from the ring gear first and second distances, respectively. In this manner, the pinion offset and gear mounting distance may be varied. The pinion cage is secured to the housing, preferably by fasteners, in one of the positions to accommodate a particular gearset.

Accordingly, the present invention provides an axle assembly that uses a common differential case and limited ring gear thickness variation for multiple axle gear ratios and pinion offset.

BRIEF DESCRIPTION OF THE DRAWINGS

Other advantages of the present invention can be understood by reference to the following detailed description when considered in connection with the accompanying drawings wherein:

FIG. 2 is a side cross-sectional view of the pinion cage of the present invention; and FIG. 3 is an end view of the pinion cage shown in FIG. 2.

DETAILED DESCRIPTION OF THE PREFERRED EMBODIMENT

Figure 1:
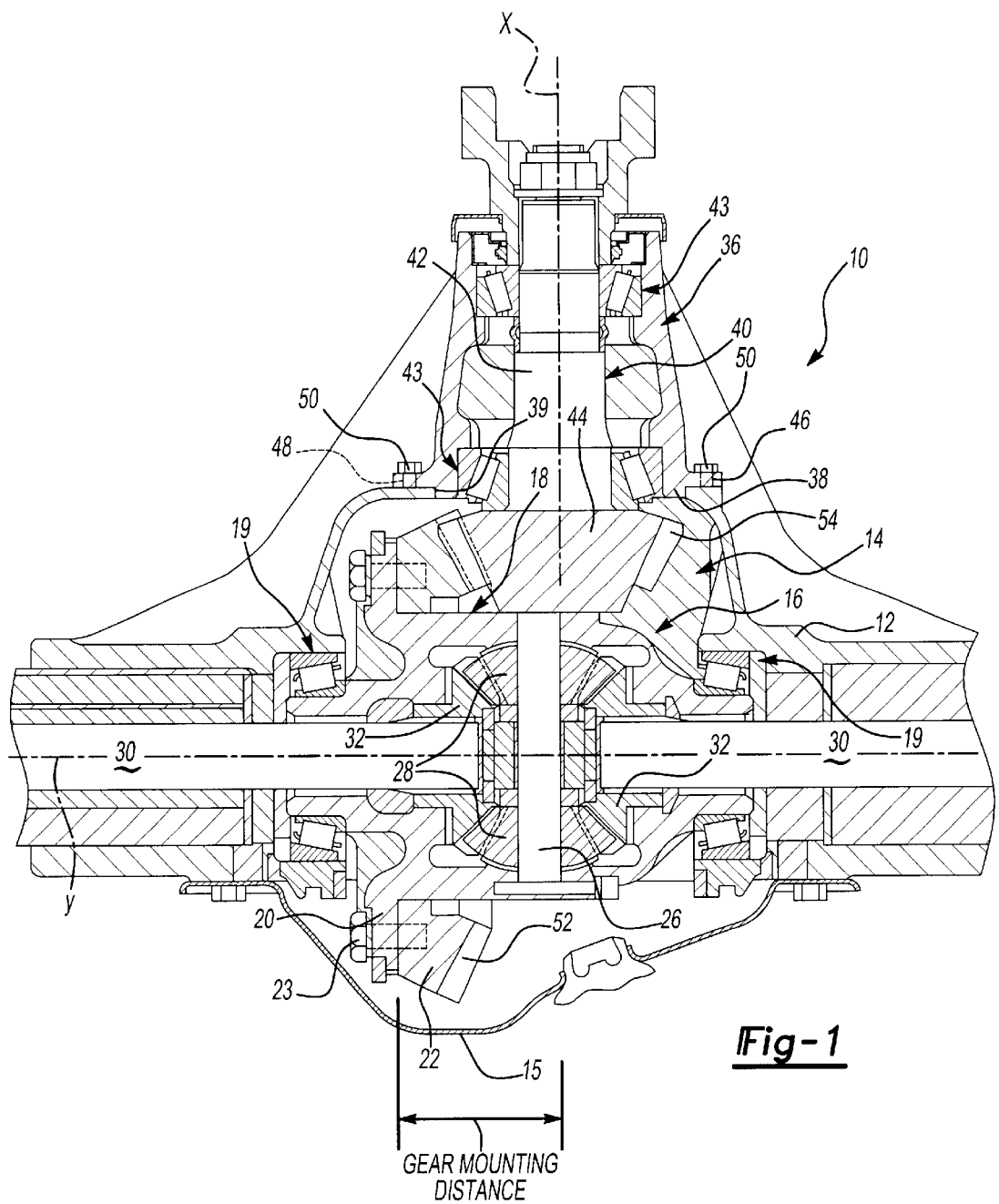
FIG. 1 is a cross-sectional view of a portion of an axle assembly in the area of the differential assembly.

A drive axle assembly 10 is shown in FIG. 1. The drive axle assembly 10 includes an axle housing 12 which may be constructed from multiple components. The axle housing 12 has a cavity 14 typically in a central portion of the drive axle assembly 10. A differential assembly 16 is disposed in the cavity 14 for permitting the wheels supported on the ends of the drive axle assembly 10 to rotate at different rates. The differential assembly 16 includes a differential case 18 having a flange 20 extending therefrom. A cover 15 is secured to the axle housing 12 and provides access to the differential assembly 16. The differential case 18 is supported within the axle housing 12 by bearings 19. A ring gear 22 is supported on the differential case 18, and is preferably secured to the flange 20 by fasteners 23. A spider 26 is attached to the differential case 18 and supports differential pinions 28, typically bevel gears. Opposing axle shafts 30 are supported within the axle housing 12 and connect to side gears 32 that are coupled to the differential pinions 28.

Often, the pinion assembly is supported by a portion of the axle housing 12 that is integrally formed therewith. That is, the pinion assembly is supported by a portion of the axle housing that is not removable. The present invention utilizes a removable pinion cage 36 for supporting a pinion assembly 40. The pinion cage 36 includes a boss 38 that is received within a opening 39 in the axle housing 12. Preferably, the boss 38 and opening 39 have a cylindrical cross-section with a center represented by axis O, as in FIG. 3. The present invention permits the use of a single pinion cage 36 and a single differential case 18 that may be used to provide multiple gear mounting distances for different axle assemblies 10.

The pinion assembly 40 includes a driveshaft 42 and a pinion 44 on the end thereof that may be integrally formed therewith or separately attached. The pinion stem 42 is supported within the pinion cage 36 by bearings 43. The pinion cage 36 includes a radial extension 46 or flange that may be used to secure the pinion cage 36 to the axle housing 12. Preferably, the pinion cage includes a plurality of holes 48 in the radial extension 46 for receiving fasteners 50 or bolts to fasten the pinion cage 36 to the axle housing 12.

Referring to FIGS. 2 and 3, the pinion 44 rotates about a first or pinion axis, X. The ring gear 22 rotates about a second or ring gear axis, Y, that is transverse to the pinion axis X. The axes X and Y may be intersecting or non-intersecting. An intersecting pinion 44 and ring gear 22 are known as spiral bevel gears. A non-intersecting pinion 44 and ring gear 22 are known as hypoid gears. As shown in FIGS. 2 and 3, the pinion assembly 40 is eccentrically supported in the pinion cage 36. That is, as the pinion cage 36 is rotated about a central axis, O, the pinion axis X moves in an arc, R. In this manner, the pinion 44 may be moved toward or away from the ring gear 22 to accommodate pinions 44 having varying diameters to provide multiple gear ratios. Said another way, the gear mounting distance may be varied by rotating the pinion cage 36. As shown in FIG. 2, the pinion 44 and ring gear 22 are hypoid gears, or said another way, the axes X and Y are offset and non-intersecting relative to one another. By rotating the pinion cage 36, the pinion offset may be set to zero, or the pinion offset may be increased or decreased, as desired. In this manner, the gear mounting distance and pinion offset are changed simultaneously by rotating the pinion cage 36.

As mentioned above, the ring gear 22 is fastened to a flange 20 of the differential case 18. The prior art has provided multiple differential case castings with different flange locations or has increased or decreased the thickness of the ring gears 22 to accommodate pinions 44 having various diameters for providing multiple gear ratios for different axle assemblies. However, it is desirable to utilize common parts across multiple axle assemblies with different gear ratios to reduce weight and cost of the axle assembly. When a different pinion 44 is used to achieve a particular gear ratio or a different pinion offset is desired, the pinion cage 36 may be indexed or moved between a plurality of positions to move the pinion 44 away from or toward the ring gear 22 to couple the pinion 44 and ring gear 22 and along the ring gear 22 into engagement with one another, which is made possible by the eccentric location of pinion axis X on the pinion cage 36.

As best seen in FIG. 3, the pinion axis X is spaced from the central axis O of the pinion cage 36. Preferably, the central axis O is the center of the boss 38 so that the boss 38 may be used as a guide about which to locate the pinion cage 36 within the opening 39 of the axle housing 12. The pinion cage 36 may be located about the central axis O between the plurality of positions A, B and C. Position A is the pinion axis X as shown in FIGS. 2 and 3. When a smaller pinion 44 is used to achieve an axle assembly 10 with a higher gear ratio, the pinion cage 36 may be rotated or indexed to position B to decrease the gear mounting distance. When a larger pinion 44 is used to achieve an axle assembly 10 with a lower gear ratio, the pinion cage 36 may be indexed or rotated to position C, which spaces the pinion 44 at a greater distance from ring gear 22. In this manner, a common differential case casting 18 and a common pinion cage casting 36 may be used to achieve multiple gear ratios and pinion offsets for different axle assemblies 10. The holes 48 in the radial extension 46 may be of a number and in a location that facilitates using the same pinion cage 36 for multiple axle assemblies.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described. For example, the invention may be used in different mechanical devices other than for axles.

What is claimed is:

1. A drive axle assembly comprising:
   an axle housing having a cavity;
   a differential case disposed within said cavity;
   a ring gear supported on said differential case;
   a pinion cage eccentrically supporting a driveshaft with a pinion rotatable about a first axis, said pinion cage rotatable relative to said axle housing between first and second positions in which said first axis is spaced from said ring gear first and second distances respectively and secured to said axle housing in one of said positions to change a gear mounting distance and a pinion offset; and
   said ring gear rotatable about a second axis transverse to said first axis, said first and second axes nonintersecting in said first position, and said first and second axes intersecting in said second position to provide a zero pinion offset.

2. The assembly according to claim 1, wherein said differential case includes a flange and said ring gear is secured to said flange.

3. The assembly according to claim 1, wherein said axle housing includes an opening and said pinion cage includes a boss received in said opening, said boss rotatable within said opening in said axle housing.

4. The assembly according to claim 1, wherein said first and second axes are nonintersecting in said second position.

5. The assembly according to claim 1, wherein said pinion cage includes a radial extension securing said pinion cage to said axle housing, said pinion eccentrically located relative to said radial extension.

6. The assembly according to claim 1, wherein said differential case includes a spider supporting differential pinions which are meshed with side gears that are coupled with a pair of axle shafts supported in said axle housing.

7. A method of assembling drive axle assemblies having different gear ratios comprising the steps of:
   a) selecting a pinion cage having a first pinion with a first diameter;
   b) rotating the pinion cage relative to a first axle housing to line up the first pinion with a ring gear;
   c) coupling the first pinion with the ring gear;
   d) fastening the pinion cage to the first axle housing;
   e) selecting another pinion cage having a second pinion with a second diameter different than said first diameter;
   f) rotating the other pinion cage relative to a second axle housing to line up the second pinion with a ring gear that is that same as the first axle housing ring gear;
   g) coupling the second pinion with the ring gear of the second axle housing; and
   h) fastening the other pinion cage to the second axle housing.

8. The method according to claim 7, wherein steps b) and f) include moving the pinion assembly toward the ring gear in an arc.

* * * * *